(12) United States Patent
Ohrem et al.

(10) Patent No.: US 12,270,483 B2
(45) Date of Patent: Apr. 8, 2025

(54) DEVICE FOR CONTROLLING A FLOW RATE AND EXPANDING A FLUID IN A FLUID CIRCUIT AND METHOD FOR OPERATING THE DEVICE

(71) Applicant: Hanon Systems, Daejeon (KR)

(72) Inventors: Carsten Ohrem, Bergheim (DE); Daniel Zens, Kreuzau (DE); Gregor Dünnwald, Erftstadt (DE)

(73) Assignee: HANON SYSTEMS, Daejeon (KR)

( * ) Notice: Subject to any disclaimer, the term of this patent is extended or adjusted under 35 U.S.C. 154(b) by 457 days.

(21) Appl. No.: 17/755,850

(22) PCT Filed: Nov. 12, 2020

(86) PCT No.: PCT/KR2020/015838
§ 371 (c)(1),
(2) Date: May 10, 2022

(87) PCT Pub. No.: WO2021/125566
PCT Pub. Date: Jun. 24, 2021

(65) Prior Publication Data
US 2022/0403941 A1 Dec. 22, 2022

(30) Foreign Application Priority Data
Dec. 16, 2019 (DE) ...................... 10 2019 134 524.3

(51) Int. Cl.
*F16K 3/24* (2006.01)
*F16K 3/314* (2006.01)
*F25B 41/35* (2021.01)

(52) U.S. Cl.
CPC ............... *F16K 3/314* (2013.01); *F16K 3/24* (2013.01); *F25B 41/35* (2021.01)

(58) Field of Classification Search
CPC .................................. F16K 3/24; F16K 3/314
See application file for complete search history.

(56) References Cited

U.S. PATENT DOCUMENTS 4,896,860 A * 1/1990 Malone ................. F25B 41/347
251/129.05
2018/0135903 A1 5/2018 Wiechard et al.

FOREIGN PATENT DOCUMENTS

| CN | 102853128 A | 1/2013 |
| CN | 108344212 A | 7/2018 |

(Continued)

*Primary Examiner* — Paul J Gray
(74) *Attorney, Agent, or Firm* — Shumaker, Loop & Kendrick, LLP; James D. Miller

(57) ABSTRACT

A device for controlling a flow rate and expanding a fluid in a fluid circuit. The device is formed with an enclosure and a valve element arranged inside the enclosure. The valve element which is arranged movably in a linear movement in the direction of a longitudinal axis relative to the enclosure has a sealing surface and a control area formed at a first end face of the valve element and arranged adjacent to the sealing surface in the axial direction. The sealing surface is formed as a lateral surface of a straight circular cylinder with a constant outer diameter. An outer diameter of a surface of the control area corresponds to the outer diameter of the sealing surface. The control area has throughflow apertures and at least one control aperture. The valve element in the control area is formed with a substantially hollow circular cylindrical-shaped wall.

24 Claims, 4 Drawing Sheets

(56) References Cited

FOREIGN PATENT DOCUMENTS

| | | |
|---|---|---|
| DE | 102016013492 A1 | 5/2018 |
| EP | 2725267 A1 | 4/2014 |
| EP | 2725269 A1 | 4/2014 |
| EP | 3336396 A1 | 6/2018 |
| JP | 106174130 A | 6/1994 |
| KR | 1020140025596 A | 3/2014 |
| KR | 1020180087142 A | 1/2018 |

* cited by examiner

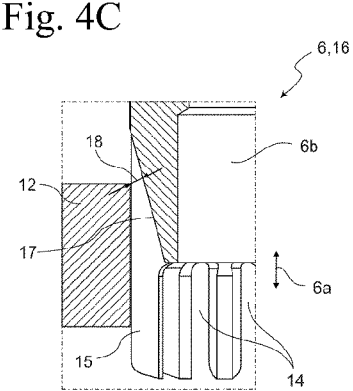

DEVICE FOR CONTROLLING A FLOW RATE AND EXPANDING A FLUID IN A FLUID CIRCUIT AND METHOD FOR OPERATING THE DEVICE

CROSS REFERENCE TO RELATED APPLICATIONS

This is a U.S. national phase patent application of PCT/KR2020/015838 filed Nov. 12, 2020 which claims the benefit of and priority to German Pat. Appl. No. 10 2019 134 524.3 filed on Dec. 16, 2019, the entire contents of each of which are incorporated herein by reference.

TECHNICAL FIELD

The invention relates to a device for controlling a flow rate and expanding a fluid in a fluid circuit, in particular a coolant in a coolant circuit of an air conditioning system of a motor vehicle. The device has an enclosure and a valve element arranged in the interior of the enclosure. The valve element is arranged to be movable in a linear movement in the direction of a longitudinal axis relative to the enclosure. The invention also relates to a method for operating the device.

BACKGROUND ART

The replacement coolant discussion resulting from the discovery of the destruction of ozone in the stratosphere, in particular by coolants containing chlorine, and the subsequent ban on such coolants revealed various solutions, including the use of natural coolants. Energetic, safety-related or thermodynamic properties of the environmentally friendly coolants, such as carbon dioxide, ammonia, water and air, however, limit the broad use of coolants. Based on the natural coolants mentioned, carbon dioxide appears to be the only working substance which is harmless from a safety point of view and has thermodynamically suitable properties for use in coolant circuits of compression refrigeration machines, in particular in motor vehicles.

The work process with carbon dioxide as a coolant differs thermodynamically from processes with other coolants, in particular in the corresponding pressure levels and accordingly, for example, a supercritical heat release, that is to say an isobaric, non-isothermal change in state of the coolant compared to an isobaric, isothermal change in state of a subcritical heat release in a classic cold steam process, for example with R134a or R290 as the coolant. The terms supercritical and subcritical heat release refer to the critical point as the characteristic state of the coolant. With a supercritical heat release, the process is also called transcritical process. The process of expansion of the coolant within the cycle, which is known to follow the process of heat release, begins at a much higher pressure level than in processes with conventional coolants.

A valve as a device for controlling a flow rate and expanding a coolant, in particular an expansion valve, fulfills the functions of sealing, controlling a mass flow or expanding the coolant according to a characteristic curve, as well as letting it through at full load with the flow cross-section open to the maximum. Operation with the flow cross-section of the valve open to the maximum enables the coolant to flow through with minimal or no significant pressure loss.

In addition to the functions mentioned, the valve should also meet other criteria. The transition between the sealing and controlling or expanding functions should take place as continuously as possible and therefore without a jump within the corresponding characteristic curve. Sealing must also be ensured in a de-energized state of a valve driven by an electric motor; the valve should consequently be formed to be self-sealing or self-locking. The valve must be configured for a pressure gradient applied on both sides. The pressure difference can be up to 100 bar. The valve should be usable in a temperature range of −40° C. to +120° C. or +150° C., wherein the control range of the valve must be set very precisely, as, based on the absolute pressure of up to 100 bar, said control range is very narrow.

DE 10 2016 013 492 A1 discloses an electrically driven expansion valve and shut-off valve for operation with the coolant R744. The valve has a valve body arranged in a valve body chamber as well as a sealing seat and a seal which are aligned along an axial direction of movement of the valve body within the valve. The valve is formed in such a way that in a closed state there is a pressure bypass to the valve body chamber. The valve body is provided with a passage aperture extending substantially in the axial direction as a component of the pressure bypass. The pressure bypass extends from a connection through the valve body to the valve body chamber.

Devices 1' known from the prior art for controlling a flow rate and expanding a coolant with an electric drive, as shown in FIGS. 1A and 1B, are formed with an enclosure 2 and an electric motor 3 which sets a drive shaft provided as an actuator 4 in a rotational movement 4a. Using a transmission assembly 5 formed on the drive shaft 4 oriented in an axial direction, in particular a thread, specifically a so-called movement thread, the rotational movement 4a of the drive shaft 4 about its longitudinal axis is transmitted into a translatory stroke movement of a valve element 6' which is preferably formed as a valve needle. The translatory stroke movement thus corresponds to a linear movement 6a of the valve element 6' in the axial direction, that is to say, in the direction of the longitudinal axis of the drive shaft 4.

The mating threads of the transmission assembly 5 are provided between the drive shaft 4 and the valve element 6'. The drive shaft 4, which substantially has the shape of a cylindrical rod, in particular a round rod with sections of different diameters, is inserted with a free end into an aperture 6b formed in the valve element 6'. The free end of the drive shaft 4 is arranged distally to an end connected to the electric motor 3. The aperture 6b formed inside the valve element 6' is configured as a through hole. The drive shaft 4 thus has a male thread at the free end as the first element of the mating threads, while a female thread is formed as the second element of the mating threads inside the aperture 6b of the valve element 6'.

The valve element 6' is arranged in a valve seat element 7'. The valve element 6', which is moved linearly in the axial direction and substantially extends in the axial direction, is held by a sliding rotary lock assembly 8 which prevents a rotational movement of the valve element 6' about the axial direction or the longitudinal axis of the valve element 6' and allows the linear movement 6a in the axial direction.

The device is also formed with a first port 9 and a second port 10. A passage aperture 9a of the first port is oriented in the radial direction to the valve element 6', while a passage aperture 10a of the second port 10 is oriented in the axial direction of the valve element 6'.

The passage aperture 9a of the first port 9 is pressurized by coolant at a first pressure p1, so that the pressure p1 acts on the valve element 6' substantially in the radial direction. The passage aperture 10a of the second port 10 is pressurized by coolant at a second pressure p2, so that the pressure p2 acts on the valve element 6' substantially in the axial direction. In this case, in the area of the transmission assembly 5, in particular between the drive shaft 4 and the valve element 6', a free cross-section is formed for equalizing the pressure p2. The wall surrounding the aperture 6b of the valve element 6' and the wall of the area of the drive shaft 4 arranged within the aperture 6b do not abut completely fluid-tight, so that the free cross-section formed between the drive shaft 4 and the valve element 6' as a throughflow aperture for the fluid ensures the pressure equalization in the axial direction with respect to the second pressure p2 within the valve 1'.

All the pressurized surfaces of the valve element 6' are configured in such a way that the valve element 6' is arranged in an almost isostatic state. The pressure forces acting on the valve element 6' are in equilibrium.

The valve element 6' is also arranged sealed via two sealing elements 11', 12', in particular a first, dynamic sealing element 11' to the enclosure 2 and a second, static sealing element 12' to the enclosure 2 and to the valve seat element 7'. The first sealing element 11' is formed as a sliding seal, in particular a rod seal, in the form of an axial seal or an annular seal, while the second sealing element 12' is formed as a seat seal, in particular as a valve seat seal. The second sealing element 12' is consequently arranged between the enclosure 2, the valve element 6' and the valve seat element 7'.

In FIG. 1C the valve element 6' is shown as an individual component of the valve 1' in a perspective view, while in FIG. 1D a detailed view of the valve element 6' from FIG. 1C is shown in a side view.

At a first end, the valve element 6' has an area with formations 6c as elements of the sliding rotary lock assembly 8. A first sealing surface 11a' is arranged in the axial direction towards a second end, adjacent to the area with the formations 6c. The first sealing surface 11a' is formed as a lateral surface of a straight circular cylinder and thus with a constant diameter. The second end of the valve element 6' formed as a control surface 12a' has a lateral surface with a diameter which tapers towards the end face of the valve element 6'. The maximum diameter of the control surface 12a' is smaller than the diameter of the first sealing surface 11a'. The lateral surface of the valve element 6' is formed between the first sealing surface 11a' and the control surface 12a' with a transition area 13' with a second sealing surface 13a'.

In addition, in FIG. 1D, an annular surface is illustrated, on which the pressure p2 also acts. At high pressure levels, for example up to 100 bar, even supposedly small areas cause very large forces, in particular for closing and sealing the device 1', which the electric motor 3 has to provide.

FIGS. 1E and 1F each show a detailed view of the assembly of the valve element 6' within the valve seat element 7' or within the second sealing element 12'.

In the closed state of the device 1', according to FIG. 1E, the valve element 6' abuts the second sealing element 12' in the transition area 13', while the valve element 6' in the open state of the device 1', according to FIG. 1F, is displaced with respect to the second sealing element 12' in such a way that a fully circumferential gap is formed between the valve element 6' and the second sealing element 12'.

The transition area 13' has the second circumferential sealing surface 13a' on the valve element 6' and a circumferential sealing surface 13b' on the second sealing element 12', which are formed conically in a like-minded manner to the longitudinal axis and correlate with one another. In the closed state of the device 1', the second sealing surface 13a' of the valve element 6' abuts the sealing surface 13b' of the second sealing element 12' in a fluid-tight manner, which second sealing element 12' is also sealingly connected to the enclosure 2 and the valve seat element 7'.

The conically formed second sealing surface 13a' of the valve element 6' is oriented at an angle a in the range of 3° to 6° to the longitudinal axis. As a result of the conical formation of the sealing surfaces 13a', 13b', the valve element 6' can be inserted into the second sealing element 12' in a centered manner during the process of closing the device 1'.

In the open state of the device 1', the sealing surfaces 13a', 13b' are arranged at a distance from one another. After a process of opening the device 1', during which the valve element 6' is moved away from the second sealing element 12', the device 1' is brought into a control position. The circumferential control surface 12a' of the valve element 6' extending especially in the axial direction over a larger area than the sealing surface 13b' of the transition area 13' is, like the sealing surface 13b' of the transition area 13', formed conically and oriented at an angle γ in the range of 1° to 2° to the longitudinal axis. The control surface 12a' extends from the sealing surface 13b' of the transition area 13' to the end face of the valve element 6'.

All the angles and diameters of the sealing surfaces 11a', 13a' and of the control surface 12a' are difficult to measure and must be set during production.

The conical formations of the sealing surface 13b' of the transition area 13' and the control surface 12a' of the valve element 6' are oriented in the same way. Due to the conical formation of the control surface 12a' in the direction of the longitudinal axis of the valve element 6', the flow cross-section for the fluid to be passed through the device 1' is continuously changed with the linear movement 6a of the valve element 6' in the axial direction until the valve element 6' is completely removed from the second sealing element 12' or the device 1' is closed and the valve element 6' abuts the second sealing element 12' in a fluid-tight manner. By means of the linear movement 6a of the valve element 6' in relation to the second sealing element 12' in combination with the control surface 12a', the mass flow of the fluid through the device 1' is controlled.

Due to the dimensioning of the electric drive, only a limited force is available for moving the valve element 6', that is to say the valve needle. In addition, a tight fit of the valve element 6' within the valve seat element 7' in the de-energized state of the electric motor 3 and at temperatures of −40° C. to +120° C. or 150° C. must be ensured. By generating a force acting on the valve element 6' and thus pressing the valve element 6' into the valve seat element 7', the valve element 6' can be held by the transmission assembly 5 formed as a self-locking movement thread. However, a combination of the force pressing the valve element 6' into the valve seat element 7' and a change in temperature and the associated different expansion of the components of the valve 1' leads to jamming of the components, so that the valve element 6' is immovably fixed.

Another possibility of forming the valve 1' is the defined clamping of the valve element 6' on the valve seat element 7', in particular on the second sealing element 12' arranged between the enclosure 2, the valve seat element 7' and the valve element 6', which sealing element is also referred to as a valve seat seal. The angle of the sealing cone should be selected in such a way that self-locking is achieved in the sealing area and the movement thread is thus relieved. However, this requires a very detailed and precise design of the sealing contour, since an angle of the sealing cone that is too small will result in jamming the valve element 6' within the second sealing element 12', and an angle of the sealing cone that is too large will result in leaks between the valve element 6' and the second sealing element 12'. In addition, such a concept requires very high manufacturing standards, especially with regard to surfaces and geometric tolerances. The very high tolerances required for the valve element 6' and the sum of the tolerances for assembling the device 1' make it difficult to control the manufacture of parts. Such manufacturing and measuring is very complex and costly.

The scope of the functions to be fulfilled by the device 1', the associated requirements for the device 1' and the conventional design of the device 1' require an extremely high level of accuracy, which leads to geometries with tolerances that cannot or can hardly be produced and which, in addition, after production cannot be controlled.

SUMMARY

The object of the invention is to provide and improve a device for controlling a flow rate and expanding a fluid in a fluid circuit, in particular in a coolant circuit, especially an air conditioning system of a motor vehicle, which meets the above-mentioned requirements. In particular, the configuration of the device with regard to the seal assembly and the control requirements should be improved. In addition, the production should be simple and thus the production costs should be minimal. It should also be possible to measure the device readily in series and to operate it reliably in every application, that is to say, in a large temperature range and pressure range.

The object is achieved by the subjects with the features as shown and described herein.

The object is achieved by a device for controlling a flow rate and expanding a fluid in a fluid circuit, in particular a coolant in a coolant circuit. The device has an enclosure and a valve element arranged in the interior of the enclosure. The valve element is arranged moveably in a linear movement in the direction of a longitudinal axis relative to the enclosure.

According to the conception of the invention, the valve element is formed with a sealing surface and a control area provided on a first end face of the valve element and arranged adjacent to the sealing surface in the axial direction. The sealing surface has the shape of a lateral surface of a straight circular cylinder with a constant outer diameter. In addition, an outside diameter of a surface of the control area corresponds to the outside diameter of the sealing surface, so that the valve element is formed with a diameter that is constant over the sealing surface and the surface of the control area. The control area has throughflow apertures and at least one control aperture, wherein the valve element is formed in the control area with a substantially hollow circular cylindrical-shaped wall. The wall of the valve element is interrupted by the throughflow apertures and the at least one control aperture.

According to a further development of the invention, the throughflow apertures or the at least one control aperture each have the shape of a cut which, starting from the first end face of the valve element, is formed extending in the axial direction into the wall of the valve element. The throughflow apertures and the at least one control aperture are preferably oriented parallel to one another and advantageously arranged at the valve element at a uniform distance and circumferentially evenly distributed. In particular, side walls of the cuts each formed in the axial direction and in pairs can be oriented parallel to one another. In addition, the side walls of the cuts can each be arranged equally spaced from one another.

According to a preferred configuration of the invention, the throughflow apertures each have the same extension in the direction of the longitudinal axis of the device, while the at least one control aperture can have a larger extension in the direction of the longitudinal axis of the device than the throughflow apertures.

Another advantage of the invention is that the at least one control aperture has a first section and a second section in a longitudinal extension. Here the control aperture is formed in the first section with a fully perforated wall of the valve element and in the second section with a steadily increasing wall thickness of the wall of the valve element and a groove base and hence with a closed wall.

Consequently, the shape of the first section of the control aperture preferably corresponds substantially to the shape of a throughflow aperture. The longitudinal extensions, that is to say the extensions in the direction of the longitudinal axis, of the first section and the second section of the control aperture are preferably identical.

The second section of the control aperture advantageously has a free cross-section that tapers in the direction of the sealing surface. The wall thickness of the wall of the valve element increases continuously from zero, in particular starting on an inner surface of the valve element, to the maximum wall thickness at a transition to the sealing surface, so that the second section of the control aperture is formed wedge-shaped in the axial direction and the wall of the valve element is closed by the groove base.

The free cross-section of the control aperture is understood to mean a flow cross-section for the fluid within the wall of the valve element arranged in a plane oriented perpendicular to the longitudinal axis. With a constant width of the control aperture in the circumferential direction of the valve element and depending on the position with respect to the longitudinal axis, away from the first end face the cross-section of the control aperture in the direction of the longitudinal axis becomes smaller with decreasing distance between the groove base and the outside of the valve element and thus the distance in the radial direction.

According to an advantageous configuration of the invention, the valve element has an aperture which is formed as a through hole and arranged concentrically extending in the direction of the longitudinal axis.

According to a further development of the invention the device has an actuator and a transmission assembly and a sliding rotary lock assembly for transmitting a rotational movement of the actuator into the linear movement of the valve element. Here, the actuator advantageously is formed as a drive shaft oriented in the axial direction, which preferably is connected to an electric motor, in particular a stepping motor or a servomotor, which can set the drive shaft in a rotational movement about the longitudinal axis. One advantage of the invention is that the drive shaft is fixed in the axial direction within the enclosure.

According to another preferred configuration of the invention, the transmission assembly is formed as mating threads between the drive shaft and the valve element. Here the drive shaft is inserted in the aperture formed in the valve element.

In addition, a male thread is provided in particular on an outside of the rotationally symmetrical drive shaft, and a female thread is provided inside the aperture. Preferably, the male thread is formed over the entire circumference.

Furthermore, the transmission assembly can have a free cross-section between the drive shaft and the valve element, for example, in order to ensure pressure equalization around the valve element, especially in the axial direction. In this case, the free cross-section is provided in particular as a flattened area of the thread of the drive shaft, which is otherwise formed with a circular cross-section.

Another advantage of the invention is the fact that the valve element is formed with formations. The formations are arranged as first components of the sliding rotary lock assembly at a second end face oriented towards the actuator and in pairs opposite one another protruding from the valve element in an orthogonal direction to the longitudinal axis. In addition, in the area of the formations of the valve element the enclosure has recesses as second components of the sliding rotary lock assembly that are arranged opposite one another with respect to the longitudinal axis of the valve element. With respect to shape the recesses of the enclosure correspond in each case to a formation of the valve element.

The sealing surface of the valve element is arranged extending in particular from the area of the formations in the direction of the first end face that is arranged distally opposite to the control area.

In addition, the valve element is arranged for guiding and holding preferably inside a valve seat element which allows the linear movement of the valve element in the axial direction.

According to a further development of the invention, the valve element is arranged sealingly via at least two sealing elements to the enclosure and to the valve seat element. A first sealing element or a second sealing element is preferably formed as a sliding seal, sealing the valve element from the enclosure. In addition, the valve seat element can be sealed from the enclosure by means of O-ring seals.

According to another advantageous configuration of the invention, the valve element, in a closed state of the device, is arranged with the sealing surface abutting the first sealing element and the second sealing element, while the valve element, in an open state of the device, is arranged with the sealing surface abutting the first sealing element and with the surface of the control area abutting the second sealing element.

According to a further development of the invention, the enclosure is formed with ports for connecting to fluid lines, which are each connected to the interior of the enclosure via a passage aperture. In this case, axes of symmetry of the passage apertures of the ports of the enclosure have a common point of intersection where the valve element is arranged.

The passage aperture of the first port of the enclosure is preferably oriented in a radial direction to the longitudinal axis, while the passage aperture of the second port of the enclosure is arranged on an opposite side of the actuator to the valve element. In addition, the axis of symmetry of the passage aperture of the second port of the enclosure and the longitudinal axis or the axis of rotation of the valve element can be arranged coaxially aligned with one another.

The object is also achieved by a method according to the invention for operating an aforementioned device for controlling a flow rate and expanding a fluid in a fluid circuit, in particular a coolant in a coolant circuit. The method consists of the following steps:
- setting an actuator in a rotational movement about a longitudinal axis,
- transmitting the rotational movement of the actuator by means of a transmission assembly and a sliding rotary lock assembly into a linear movement of the valve element in the direction of the longitudinal axis relative to the enclosure, so that the valve element is moved linearly along the longitudinal axis, wherein
- depending on the direction of rotation of the actuator, the device is opened or closed,
- the valve element is always guided within preferably exclusively two sealing elements, the valve element always abutting a first sealing element with a sealing surface and, depending on the position, abutting a second sealing element with the sealing surface or a surface of a control area, and
- a degree of opening of the device, depending on the assembly of the control area of the valve element is set with throughflow apertures extending in the direction of the longitudinal axis and at least one control aperture within the second sealing element.

The degree of opening of the device is understood to mean a free flow cross-section for the fluid to be passed through the device. The degree of opening can be varied between zero, when the device is in the closed state, and 100% when the device is in the fully open state.

The advantageous configuration of the invention enables the device to be used for controlling a flow rate and for expanding a fluid in a coolant circuit of an air conditioning system of a motor vehicle.

The device according to the invention and the method for operating the device for controlling a flow rate and expanding a fluid in a fluid circuit have, in summary, further diverse advantages:
- production-optimized implementation of the device with regard to the required functions with high reliability in terms of sealing and avoiding jamming of the valve element,
- use in series production, in particular since the valve element of the device can be measured readily,
- reliable operation in a large temperature range and pressure range, also due to the force-free assembly of the valve element, in particular for closing and sealing the valve, with regard to the pressure of the fluid and the formation of the sealing surface, even when the electric motor is de-energized, and the valve element does not jam, especially within the thread of the transmission assembly due to different thermal expansion of the enclosure, which is preferably made of aluminum, and other components, which are made, for example, of steel, and
- simple production of the device, in particular by dispensing with manufacturing accuracies and complex manufacturing processes and measurement methods, resulting in minimal production costs.

BRIEF DESCRIPTION OF DRAWINGS

Further details, features and advantages of configurations of the invention emerge from the following description of exemplary embodiments with reference to the associated drawings.

FIGS. 1E and 1F: each show a detailed view of the assembly of the valve element 6' within the valve seat element 7' or within the second sealing element 12', wherein FIG. 1E shows the closed state of the device 1' and FIG. 1F shows the valve element 6' in the open state of the device 1', FIG. 4C: shows a detailed view of the assembly of the valve element inside the enclosure or the valve seat element, in particular, a second sealing element.

DESCRIPTION OF AN EMBODIMENT

Figure 2A:
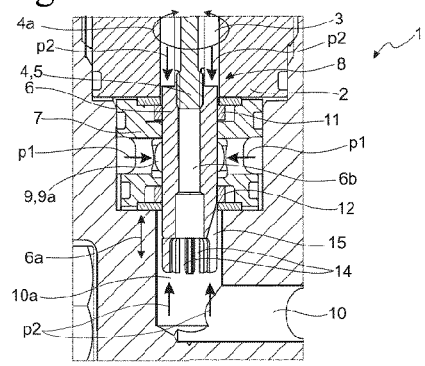
FIGS. 2A to 2C: show a device for controlling a flow rate and expanding a fluid in a fluid circuit, in particular a coolant circuit of an air conditioning system of a motor vehicle, with an enclosure and valve element arranged within the enclosure, as well as an actuator with a transmission assembly in the closed and open state and a control position, each in a lateral sectional illustration.
Figure 2B:
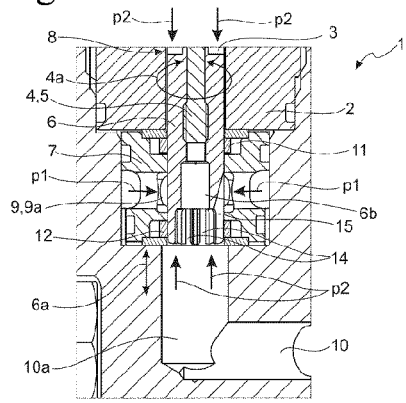
Figure 2C:
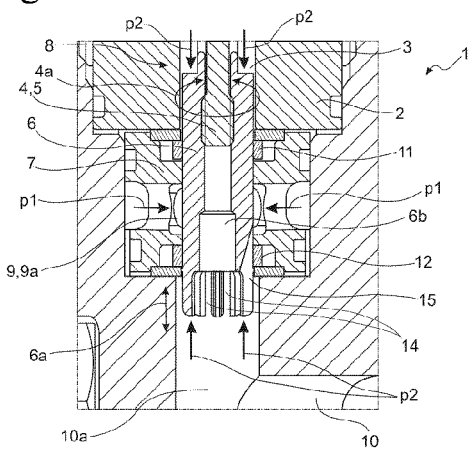

FIGS. 2A to 2C each show a device 1 for controlling a flow rate and expansion of a fluid in a fluid circuit, in particular a valve 1, especially in a coolant circuit of an air conditioning system of a motor vehicle, with an enclosure 2 and a valve element 6 arranged in the interior of the enclosure 2, as well as an actuator 4 with a transmission assembly 5 in a closed as well as an open state and a control state of the device 1, each shown in a lateral sectional illustration. The device 1, in particular a valve, is driven via an electric motor 3. With the electric motor 3, a drive shaft formed as an actuator 4 is set in a rotational movement 4a.

By means of the transmission assembly 5, which is formed in particular as a thread, specifically as a movement thread, on the drive shaft 4, which is oriented in the axial direction, in conjunction with a sliding rotary lock assembly 8, the rotational movement 4a of the drive shaft 4 about its longitudinal axis is transmitted into a translatory stroke movement of the valve element 6 which is preferably formed as a valve needle and thus a linear movement 6a in the axial direction or in the direction of the longitudinal axis of the drive shaft 4.

The mating threads of the transmission assembly 5 are provided between the drive shaft 4 and the valve element 6. The drive shaft 4, which substantially has the shape of a cylindrical rod, in particular a round rod with sections of different diameters, is inserted with a free end in an aperture 6b formed in the valve element 6 as a first component of the transmission assembly 5. The free end of the drive shaft 4, which is also referred to as the end section of the drive shaft 4 and is formed as a second component of the transmission assembly 5, is arranged distally to an end of the drive shaft 4 connected to the electric motor 3. The aperture 6b provided within the valve element 6 is formed as a through hole which extends along the axis of rotation or the longitudinal axis of the valve element 6. Consequently, the drive shaft 4 at the free end has a male thread as a first element of the mating threads, while a female thread is formed as a second element of the mating threads inside the aperture 6b of the valve element 6.

Figure 3A:
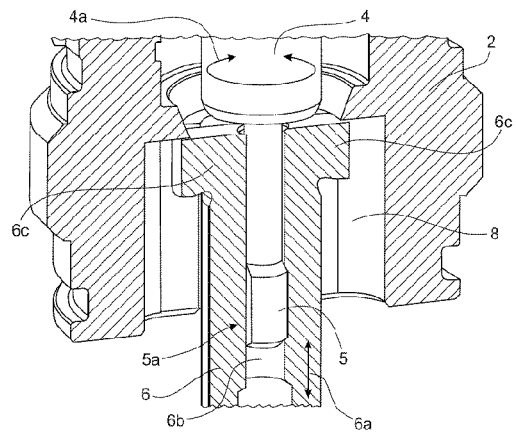
FIGS. 3A and 3B: show an assembly of the valve element within the enclosure with a sliding rotary lock assembly for transmitting a rotational movement of the actuator into a linear movement of the valve element along the axis of rotation, in a sectional illustration of a plane through the axis of rotation and a sectional illustration perpendicular to the axis of rotation.
Figure 3B:
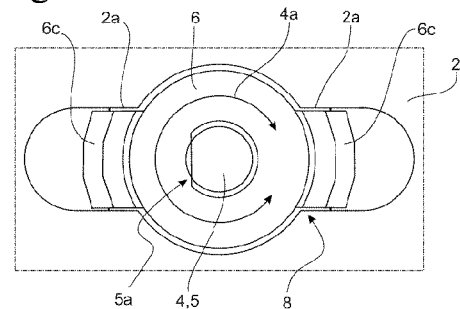

In the area sliding along inside the enclosure 2, the valve element 6 has formations 6c, which are formed on an end of the valve element 6 oriented towards the electric motor 3 and protrude in pairs opposite to one another from the valve element 6 in an orthogonal direction to the longitudinal axis, which is particularly evident from FIGS. 3A and 3B. FIGS. 3A and 3B show an assembly of the valve element 6 within the enclosure 2 with the sliding rotary lock assembly 8 for transmitting the rotational movement 4a of the drive shaft 4 into the linear movement 6a of the valve element 6 along the axis of rotation in a sectional illustration of a plane through the axis of rotation and a sectional illustration perpendicular to the axis of rotation. According to the section of the plane through the longitudinal axis of the device 1 according to FIG. 3A, the valve element 6 has a T-shape in the cross-section.

In the area of the formations 6c of the valve element 6 the enclosure 2 is formed with notch-shaped or groove-like recesses 2a arranged opposite one another with respect to the longitudinal axis of the valve element 6, which, in each case, correspond in shape to a formation 6c of the valve element 6. The shapes of the recesses 2a of the enclosure 2 each correspond to the outer shape of the formations 6c of the valve element 6 plus a play for sliding movement of the valve element 6 within the enclosure 2 in the axial direction.

By arranging the formations 6c of the cross-sectionally T-shaped valve element 6 within the notch-shaped or groove-like recesses 2a of the enclosure 2, a rotational movement of the valve element 6, driven by the actuator 4 rotating about the longitudinal axis, is prevented. The valve element 6 is thus moved by the rotational movement 4a of the actuator 4 without its own rotation about the longitudinal axis in the linear movement 6a.

According to FIGS. 2A to 2C, the valve element 6 is arranged within a valve seat element 7 which allows the linear movement 6a of the valve element 6 in the axial direction.

The device 1 is also formed with a first port 9 and a second port 10 for connecting to fluid lines. A passage aperture 9a of the first port 9 is oriented in the radial direction to the valve element 6, while a passage aperture 10a of the second port 10 is oriented in the axial direction of the valve element 6. The passage aperture 9a of the first port 9 is pressurized by coolant at a first pressure p1, so that the pressure p1 acts on the valve element 6 substantially in the radial direction. The passage aperture 10a of the second port 10 is pressurized by coolant at a second pressure p2, so that the pressure p2 acts on the valve element 6 substantially in the axial direction. All the pressurized surfaces of the valve body 6 are configured in such a way that the valve element 6 is arranged in an almost isostatic state. The pressure forces acting on the valve element 6 are in equilibrium.

Here, the transmission assembly 5 is formed with a free cross-section between the drive shaft 4 and the valve element 6. The wall surrounding the aperture 6b of the valve element 6 and the wall of the end section of the drive shaft 4 do not abut completely fluid-tight. The introduction of a section 5a formed as a flattened area within the transmission assembly 5 of the thread of actuator 4 which otherwise has a circular cross-section, according to FIGS. 3A and 3B, ensures as a throughflow aperture in combination with the aperture 6b of the valve element 6 the pressure equalization with respect to the second pressure p2 acting in the axial direction within the valve 1.

The valve element 6 is arranged sealed via two sealing elements 11, 12, in particular a first, dynamic sealing element 11 and a second, dynamic sealing element 12 to the enclosure 2 or the valve seat element 7. The sealing elements 11, 12 are formed to separate the areas within the device 1 that are pressurized at different pressure levels, in particular when the device 1 is used in a coolant circuit, a high pressure level and a low pressure level or suction pressure level.

The sealing elements 11, 12 formed within the device 1 in each case as a sliding seal, in particular a rod seal, in the form of an axial seal or an annular seal, and for internal sealing of the areas pressurized at different pressure levels, such as a high pressure side and a low pressure side of a coolant circuit, are arranged at a distance to one another in the axial direction at distal ends of the valve seat element 7. Here, the valve element 6 has a lateral surface of a straight circular cylinder with a constant outer diameter, which extends starting from the area of the formations 6c to a first end face in the direction of the passage aperture 10a of the second port 10.

Each of the first sealing element 11 and the second sealing element 12 act in the radial direction, so that on the one hand there is no need of applying an axial sealing force, as known from the prior art devices. On the other hand, the requirements for ensuring tightness in the de-energized state as well as jamming and possible leaks are eliminated.

In the area of the first end face oriented in the direction of the passage aperture 10a of the second port 10, the valve element 6 is formed with throughflow apertures 14 and at least one control aperture 15. Both the throughflow apertures 14 and the at least one control aperture 15 each have the shape of a cut which, starting from the end face of the valve element 6, extend in the axial direction into the valve element 6. The throughflow apertures 14 and the at least one control aperture 15 are oriented parallel to one another.

Figure 4A:
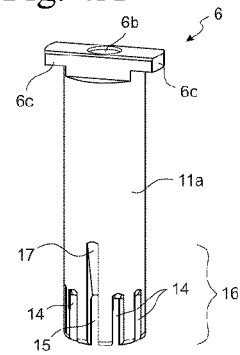
FIGS. 4A and 4B: show the valve element as an individual component, and in a detailed view of an end face with a control aperture and throughflow apertures, each in a perspective view.
Figure 4B:
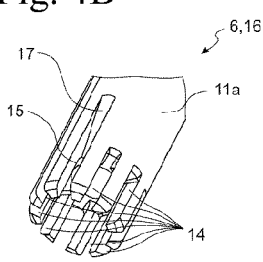

FIGS. 4A and 4B show the valve element 6 as an individual component and in a detailed view of the first end face with the throughflow apertures 14 and a control aperture 15, each in a perspective view, while FIG. 4C shows a detailed view of the assembly of the valve element 6 within the second sealing element 12 or a detailed view of the device 1 in the control position according to FIG. 2C.

The valve element 6 has a sealing surface 11a, which is formed in the shape of the lateral surface of a straight circular cylinder with a constant outer diameter and is arranged extending then to the area of the formations 6c of the sliding rotary lock assembly 8 of a second end face in the direction of the opposite first end face.

A control area 16 is provided in the area of the first end face of the valve element 6. The outer diameter of the surface of the control area 16 corresponds in this case to the outer diameter of the sealing surface 11a, so that the valve element 6 is formed with a diameter that is constant over the sealing surface 11a and the surface of the control area 16. In this way, the lateral surface of the valve element 1 with the sealing surface 11a and the surface of the control area 16 can be manufactured and measured with minimal effort and with very good accuracy and surface properties.

The throughflow apertures 14, which are formed as cuts in the shape of straight grooves, notches or slots, and the control aperture 15, which is also formed in the shape of a groove, a notch or a slot, are preferably provided evenly spaced and evenly distributed over the circumference on the valve element 6. Here, the side walls of each notch, which are oriented in the axial direction, are, on the one hand, in each case oriented parallel to one another and at the same distance from one another. On the other hand, the notches of the throughflow apertures 14 each have a same extension in the direction of the longitudinal axis of the device 1 and are therefore formed to be identical. The notch of the at least one control aperture 15 has a greater extension in the direction of the longitudinal axis of the device 1 than the throughflow apertures 14.

While the cut of the control aperture 15 in the area of the throughflow apertures 14, as a first section of the control aperture 15, is formed substantially like the cuts of the throughflow apertures 14 and extends in the radial direction over the entire axial extension completely through the wall of the hollow circular cylindrical-shaped valve element 6, the wall of the valve element 6 is closed in the radial direction in the second section adjoining the first section in the axial direction.

However, the at least one control aperture 15 has a free cross-section that tapers in the direction of the sealing surface 11a in the second area. The wall thickness of the wall of the hollow circular cylindrical-shaped valve element 6 increases continuously with a constant width of the control aperture 15 in the circumferential direction from zero in the area of the cut ends of the throughflow apertures 14 to the maximum wall thickness at the transition to the sealing surface 11a. The cut of the control aperture 15 is formed wedge-shaped in the second section in the axial direction. The wall of the valve element 6 is closed by a groove base 17. The inner diameter of the wall of the control area 16 of the valve element 6 is constant.

The longitudinal extension of the first section of the control aperture 15 with the fully perforated wall of the valve element 6 and the longitudinal extension of the second section of the control aperture 15 with a steadily increasing wall thickness of the wall of the valve element 6 and groove base 17 formed are identical.

Figure 1A:
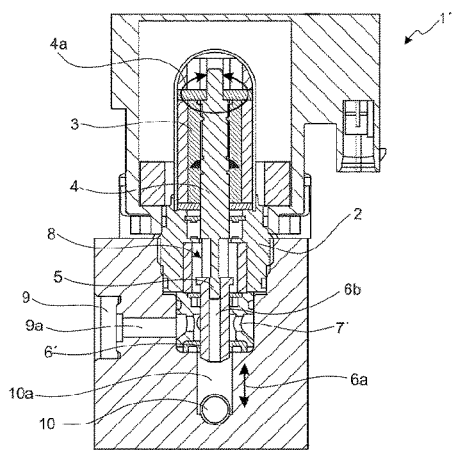
FIGS. 1A and 1B: show a device for controlling a flow rate and expanding a coolant with an electric drive.
Figure 1B:
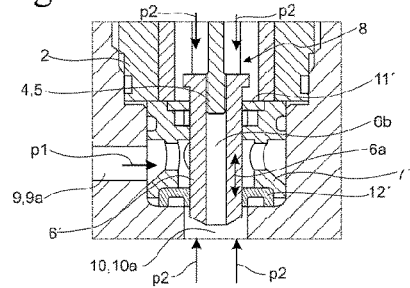
Figure 1C:
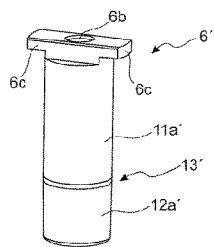
FIG. 1C: shows the valve element 6' as an individual component of the valve 1' in a perspective view.
Figure 1D:
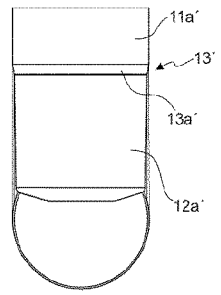
FIG. 1D: shows a detailed view of the valve element 6' from FIG. 1C in a side view.
Figure 1E:
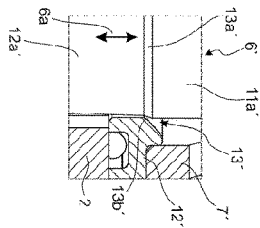
Figure 1F:
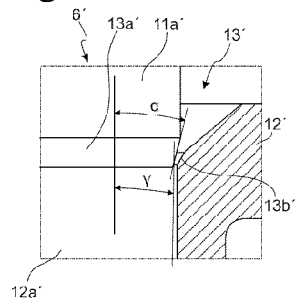

Compared to conventional devices 1', in which the flow cross-section is formed as a fully circumferential annular gap, in particular for the expanding flow of the fluid between the valve element 6' and the second sealing element 12' according to FIG. 1F, the flow cross-section of the device 1 is set and changed by means of the free cross-section of the control aperture 15.

In the illustration according to FIG. 4C, the device 1 is placed into a control position. The valve element 6 is arranged together with the control area 16 within the second sealing element 12. The throughflow apertures 14 are closed. The control aperture 15 is only partially covered by the second sealing element 12 and is therefore limited in the radial direction by the groove base 17 on the one hand and by the second sealing element 12 on the other. In this case, the flow cross-section for the flowing expansion of the fluid between the valve element 6 and the second sealing element 12 in the area of the control aperture 15 is open in the form of a gap 18, in particular a control gap.

The flow cross-section of the control gap 18 is varied continuously by means of the linear movement 6a of the valve element 6 relative to the second sealing element 12. With the opening of the throughflow apertures 14, on the one hand, the entire flow cross-section for the fluid is rapidly enlarged until the valve element 6 abuts the second sealing element 12 only in the area of the first end face. After the throughflow apertures 14 have been closed, on the other hand, the entire flow cross-section for the fluid is slowly reduced until the valve element 6 or the device 1 is closed and the valve element 6 with the sealing surface 11a also abuts the second sealing element 12 in a fluid-tight manner. Regardless of the position relative to the enclosure 2 or the sealing elements 11, 12 with the sealing surface 11a, the valve element 6 always abuts the first sealing element 11 in a fluid-tight manner.

The prestressed sealing elements 11, 12 require an inner and an outer guide. By means of the groove-shaped throughflow apertures 14 and control aperture 15 formed in the valve element 6, on the one hand, the maximum flow cross-section for the fluid can be released, while at the same time, on the other hand, the second sealing element 12 is guided over the wall of the valve element 6, which is formed as crosspieces between the throughflow apertures 14 or the control aperture 15.

The state of the device 1, in particular the closed state, the open state and the control state, is mainly determined by the assembly of the valve element 6 within the second sealing element 12.

While in conventional devices 1' even small linear movements 6a of the valve element 6' and thus small changes in the difference between the opposing diameters of the control surface 12a' and sealing element 12' have a major influence on the free flow cross-section for the fluid, small linear movements 6a of the valve element 6 of the device 1 result only in slight changes in the free flow cross-section through the control gap 18. The mass flow of the fluid through the device 1 can be set and metered much more finely.

The device 1 with the valve element 6 with the control aperture 15 is much easier to manufacture and measure compared to the known conical and cone-shaped design of the valve element 6', especially since in the design of the conventional valve element 6' the entire circumferential surface releases the flow cross-section and thus the cone shape has to have the highest accuracy in terms of the angle. In comparison, the control aperture 15 can be very well defined and measured at an axial end point via an axial starting point and a groove depth varying in the axial direction. Also, a deviation in the angle of incline of the groove base 17 in the axial direction as a tolerance has less of an effect when controlling than a deviation in the conical shape of the known valve element 6', since the control aperture 15 is also defined by the width formed in the circumferential direction of the valve element 6. The width of the control aperture 15 has to be produced and measured very accurately.

LIST OF REFERENCE NUMERALS 1, 1' device, valve
2 enclosure
2a recess of the enclosure 2
3 electric motor
4 actuator, drive shaft
4a rotational movement of the actuator 4
5 transmission assembly
5a section
6, 6' valve element
6a linear movement of the valve element 6, 6'
6b aperture of the valve element 6, 6'
6c formation of the valve element 6, 6'
7, 7' valve seat element
8 sliding rotary lock assembly
9 first port
9a passage aperture of the first port 9
10 second port
10a passage aperture of the second port 10
11, 11' first sealing element
11a, 11a' (first) sealing surface of the valve element 6, 6'
12, 12' second sealing element
12a' control surface of the valve element 6'
13' transition area
13a' second sealing surface of the valve element 6'
13b' sealing surface of the transition area 13'
14 throughflow aperture of the valve element 6
15 control aperture of the valve element 6
16 control area
17 groove base
18 gap, control gap
p1, p2 pressure
α angle of the second sealing surface 13a' of the valve element 6'
γ angle of the control surface 12a'

The invention claimed is:

1. A device for controlling a flow rate and expanding a fluid in a fluid circuit, comprising:
an enclosure; and
a valve element arranged in an interior of the enclosure, which is arranged moveably in a linear movement in a direction of a longitudinal axis relative to the enclosure, wherein the valve element has a sealing surface and a control area that is formed at a first end face of the valve element and arranged adjacent to the sealing surface in an axial direction, wherein:
the sealing surface has a shape of a lateral surface of a straight circular cylinder with a constant outer diameter and an outer diameter of a surface of the control area corresponds to an outer diameter of the sealing surface, and
the control area has throughflow apertures and at least one control aperture, the valve element in the control area being formed with a hollow circular cylindrical-shaped wall, wherein the at least one control aperture has a shape of a cut which, starting from the first end face of the valve element, is formed extending in the axial direction into the wall of the valve element, wherein the at least one control aperture in a longitudinal extension has a first section and a second section, wherein the at least one control aperture in the first section is formed with a fully perforated wall of the valve element and in the second section with a steadily increasing wall thickness of the wall of the valve element and a groove base.

2. The device according to claim 1, wherein the throughflow apertures each have a shape of a cut which, starting from the first end face of the valve element, is formed extending in the axial direction into the wall of the valve element.

3. The device according to claim 2, wherein in each case side walls of the cut formed in the axial direction and in pairs are oriented parallel to one another.

4. The device according to claim 3, wherein the side walls of the cuts are arranged equally spaced from one another in each case.

5. The device according to claim 2, wherein the throughflow apertures each have a same extension in the direction of the longitudinal axis of the device.

6. The device according to claim 1, wherein the at least one control aperture has a larger extension in the direction of the longitudinal axis of the device than the throughflow apertures.

7. The device according to claim 1, wherein a shape of the first section of the at least one control aperture corresponds to a shape of one of the throughflow apertures.

8. The device according to claim 1, wherein the second section of the at least one control aperture has a free cross-section that tapers in a direction of the sealing surface, wherein the wall thickness of the wall of the valve element increases continuously from zero to a maximum wall thickness at a transition to the sealing surface.

9. The device according to claim 1, wherein the valve element has a shaft aperture which is formed as a through hole and arranged concentrically extending in the direction of the longitudinal axis.

10. The device according to claim 1, wherein an actuator and a transmission assembly and a sliding rotary lock assembly are formed for transmitting a rotational movement of the actuator into the linear movement.

11. The device according to claim 10, wherein the actuator is formed as a drive shaft oriented in the axial direction.

12. The device according to claim 11, wherein the drive shaft is formed to be connected to an electric motor.

13. The device according to claim 11, wherein the transmission assembly is formed as mating threads between the drive shaft and the valve element, wherein the drive shaft is arranged inserted into a shaft aperture of the valve element.

14. The device according to claim 13, wherein a male thread is formed on an outer side of the drive shaft and a female thread is formed within the shaft aperture of the valve element.

15. The device according to claim 13, wherein the transmission assembly is formed with a free cross-section between the drive shaft and the valve element.

16. The device according to claim 10, wherein the valve element has formations which are formed as first components of the sliding rotary lock assembly at a second end face oriented towards the actuator and in pairs opposite one another protruding from the valve element in an orthogonal direction to the longitudinal axis.

17. The device according to claim 16, wherein the enclosure in an area of the formations of the valve element is formed with recesses as second components of the sliding rotary lock assembly arranged opposite one another with respect to the longitudinal axis of the valve element, each of which corresponds in shape to one of the formations of the valve element.

18. The device according to claim 1, wherein the valve element is arranged within a valve seat element.

19. The device according to claim 18, wherein the valve element is arranged sealingly via at least two sealing elements to the enclosure and to the valve seat element.

20. The device according to claim 19, wherein a first one of the sealing elements is formed as a sliding seal.

21. The device according to claim 20, wherein a second one of the sealing element is formed as a sliding seal.

22. The device according to claim 21, wherein the valve element, in a closed state of the device, is arranged with the sealing surface abutting the first one of the sealing elements and the second one of the sealing elements, and that the valve element, in an open state of the device, is arranged with the sealing surface abutting the first one of the sealing elements and with the surface of the control area abutting the second one of the sealing elements.

23. A method for operating the device for controlling the flow rate and expanding the fluid in a fluid circuit according to claim 1, comprising the following steps:
setting an actuator in a rotational movement about the longitudinal axis,
transmitting the rotational movement of the actuator by means of a transmission assembly and a sliding rotary lock assembly into the linear movement of the valve element in the direction of the longitudinal axis relative to the enclosure, so that the valve element is moved linearly along the longitudinal axis, wherein:
the device is opened or closed depending on a direction of rotation of the actuator,
the valve element is always guided within two sealing elements, the valve element is always abutting a first one of the sealing elements with the sealing surface, and, depending on a position, abutting a second one of the sealing elements with the sealing surface or the surface of the control area, and
a degree of opening of the device, depending on an assembly of the control area of the valve element is set with the throughflow apertures extending in the direction of the longitudinal axis and the at least one control aperture within the second one of the sealing elements.

24. Use of the device for controlling the flow rate and expanding the fluid according to claim 1 in a coolant circuit of an air conditioning system of a motor vehicle.

* * * * *